(12) United States Patent
Liang

(10) Patent No.: US 8,238,083 B2
(45) Date of Patent: Aug. 7, 2012

(54) SLIDE MECHANISM FOR SLIDE-TYPE PORTABLE ELECTRONIC DEVICE

(75) Inventor: Shi-Xu Liang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 215 days.

(21) Appl. No.: 12/819,303

(22) Filed: Jun. 21, 2010

(65) Prior Publication Data
US 2011/0242737 A1    Oct. 6, 2011

(30) Foreign Application Priority Data
Mar. 31, 2010   (CN) .......................... 2010 1 0137058

(51) Int. Cl.
*G06F 1/16*    (2006.01)

(52) U.S. Cl. .................. 361/679.1; 455/575.3; 720/656; 206/764

(58) Field of Classification Search .............. 455/575.4, 455/422.1, 575.3, 575.1; 720/732, 614, 656; 312/223.2, 223.3, 334.4, 323, 219; 345/8, 345/163; 361/679.1, 679.27, 679.4, 679.08, 361/679.43, 679.44; 206/308.2, 807, 343, 206/1.5, 764; 248/657, 229.1
See application file for complete search history.

(56) References Cited

U.S. PATENT DOCUMENTS
2009/0149229 A1* 6/2009 Li et al. ...................... 455/575.4
2009/0244820 A1* 10/2009 Kusaka et al. ............. 361/679.1
2010/0022286 A1* 1/2010 Wang et al. ................ 455/575.4
* cited by examiner Primary Examiner — Hung Duong
(74) Attorney, Agent, or Firm — Altis Law Group, Inc.

(57) ABSTRACT

A slide mechanism includes a main plate, a slide plate, an elastic member, and two connecting members. The main plate includes two rail portions and two guide rails. Each rail portion defines a guiding slot. Each guide rail is received in one of the guiding slot and defines a slide groove. The elastic member is secured on the main plate and the slide plate. The two connecting members are secured to the slide plate and each connecting member is slideably received in one of the guiding slots.

12 Claims, 5 Drawing Sheets

SLIDE MECHANISM FOR SLIDE-TYPE PORTABLE ELECTRONIC DEVICE

BACKGROUND

1. Technical Field

The present disclosure relates to slide mechanisms, particularly, to a portable electronic device with two or more housings using a sliding mechanism that allows one housing to slide relative to another housing.

2. Description of Related Art

Slide-type portable electronic devices have been increasingly used among diverse designs for portable electronic devices. The slide-type portable electronic device has two housings, of which one typically slides over the other to open/close the portable electronic device.

However, slide mechanisms are generally used in the slide-type portable electronic devices merely for driving the sliding between the two housings and can not protect other members such as a display panel in the portable electronic device.

Therefore, there is room for improvement within the art.

BRIEF DESCRIPTION OF THE DRAWINGS

Many aspects of the slide mechanism for slide-type portable electronic device can be better understood with reference to the following drawings. The components in the drawings are not necessarily drawn to scale, the emphasis instead being placed upon clearly illustrating the principles of the slide mechanism for slide-type portable electronic device.

DETAILED DESCRIPTION

Figure 1:
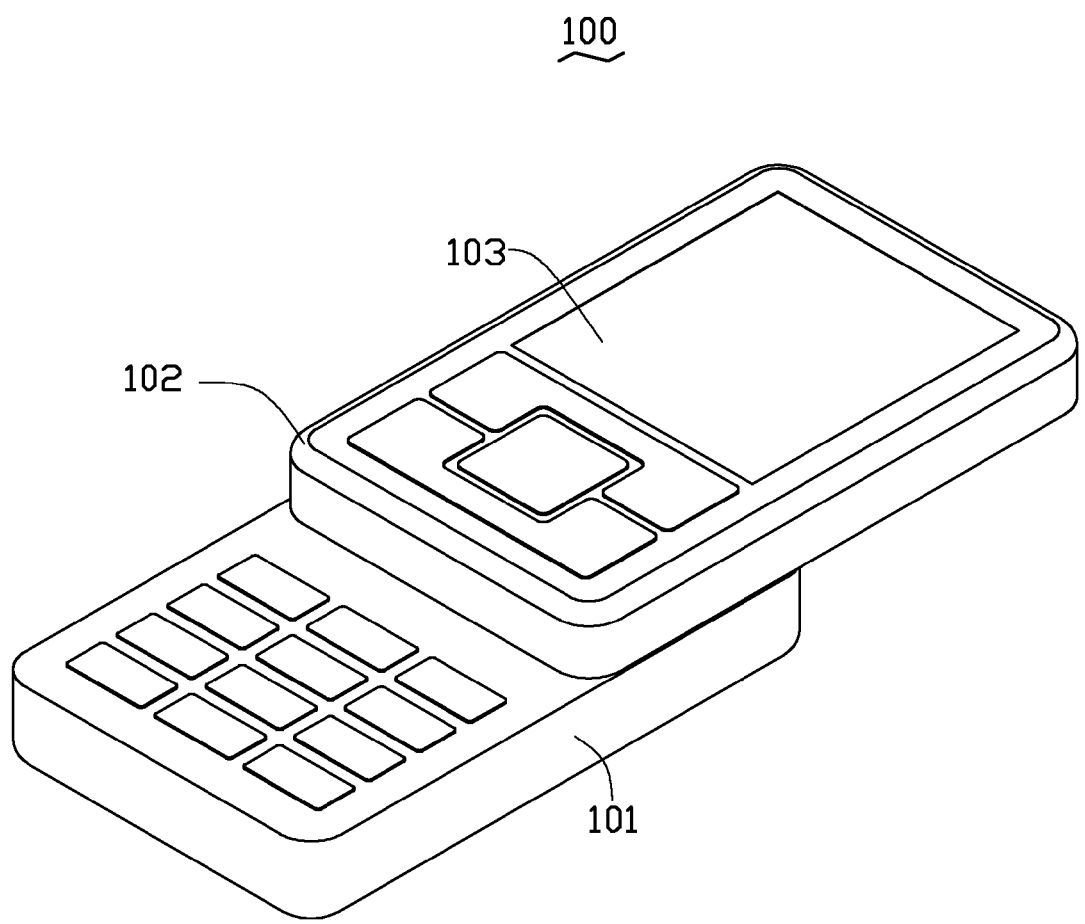
FIG. 1 is a schematic view of a portable electronic device using a slide mechanism, according to an exemplary embodiment.
Figure 2:
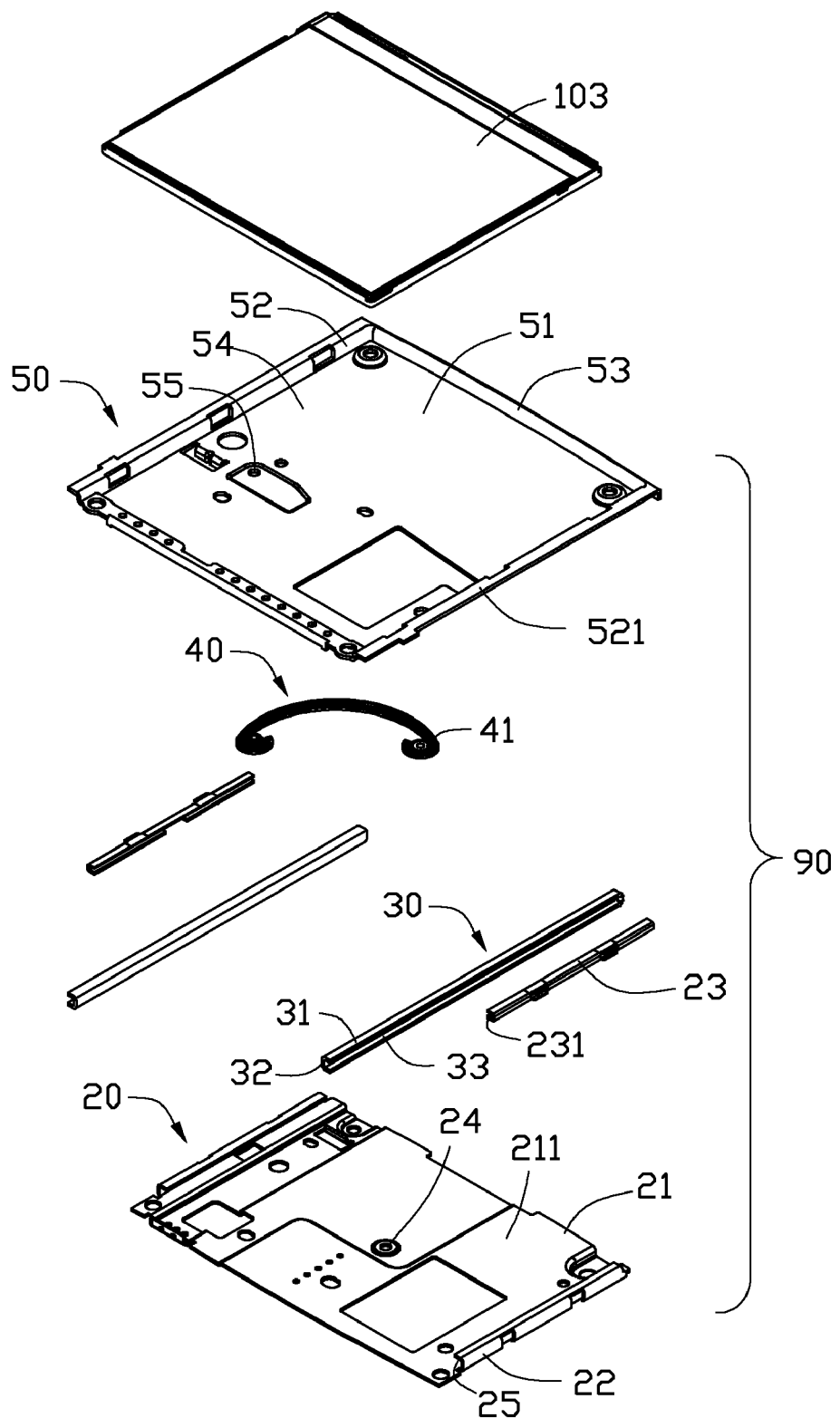
FIG. 2 is an exploded view of the slide mechanism used in the portable electronic device of FIG. 1.

FIGS. 1 and 2 show an exemplary slide mechanism 90 used in a slide-type portable electronic device 100 such as a mobile phone, a personal digital assistant, etc. The portable electronic device 100 includes a first housing 101, a second housing 102 and a display panel 103. The second housing 102 engages with the first housing 101. The display panel 103 is attached to the second housing 102. The slide mechanism 90 provides an elastic force sufficient to slide the first and second housings 101 and 102 relative to each other.

The slide mechanism 90 includes a main plate 20, two connecting members 30, an elastic member 40, and a slide plate 50. The main plate 20 and the slide plate 50 are fixed to the first housing 101 and the second housing 102, respectively. The two connecting members 30 and the elastic member 40 slideably attach the slide plate 50 to the main plate 20.

The main plate 20 includes a main base portion 21, two rail portions 22, and two guiding rails 23. The main base portion 21 includes a first surface 211 facing the slide plate 50 and defines a first mounting hole 24 therein. Each rail portion 22 is positioned at an opposite border of the main base portion 21. Each rail portion 22 is generally U-shaped and defines a guiding slot 25. Each guiding rail 23 is similar in shape to the rail portion 22 and defines a slide groove 231 therein. Each guiding rail 23 is fixed in one of the guiding slots 25. In an alternative exemplary embodiment, the guide rails 23 may be omitted (shown in FIG. 5). The guiding rails 23 may be elastic and have a low coefficient of friction.

Each connecting member 30 is generally U-shaped and includes a fixing portion 31, a slide portion 32 opposite to the fixing portion 31, and a connecting portion 33 connecting the fixing portion 31 to the slide portion 32. The fixing portion 31 is configured to be fixed to the slide plate 50. In an exemplary embodiment including guide rails, the slide portion 32 is slideably received in the guide slot 25 using slide groove 231. In an exemplary embodiment excluding guide rails, the slide portion 32 is directly slideably received in the guide slot 25.

A connecting portion 41 is formed at each end of the elastic member 40. The connecting portions 41 are configured to be respectively secured to the main plate 20 and the slide plate 50. The elastic member 40 is designed to have a predetermined torsion force to drive the main plate 20 to slide relative to the slide plate 50 from a closed state to an open state.

The slide plate 50 includes a main base portion 51, two opposite side walls 52, and an end portion 53. The side walls 52 and the end portion 53 perpendicularly connect to edges of the main base portion 51, and form a recessed portion 54 to receive the display panel 103. The main base portion 51 defines a second mounting hole 55. Each side wall 52 includes an extending portion 521 perpendicularly extending from an edge thereof to fix the fixing portion 31 of each connecting member 30.

Figure 3:
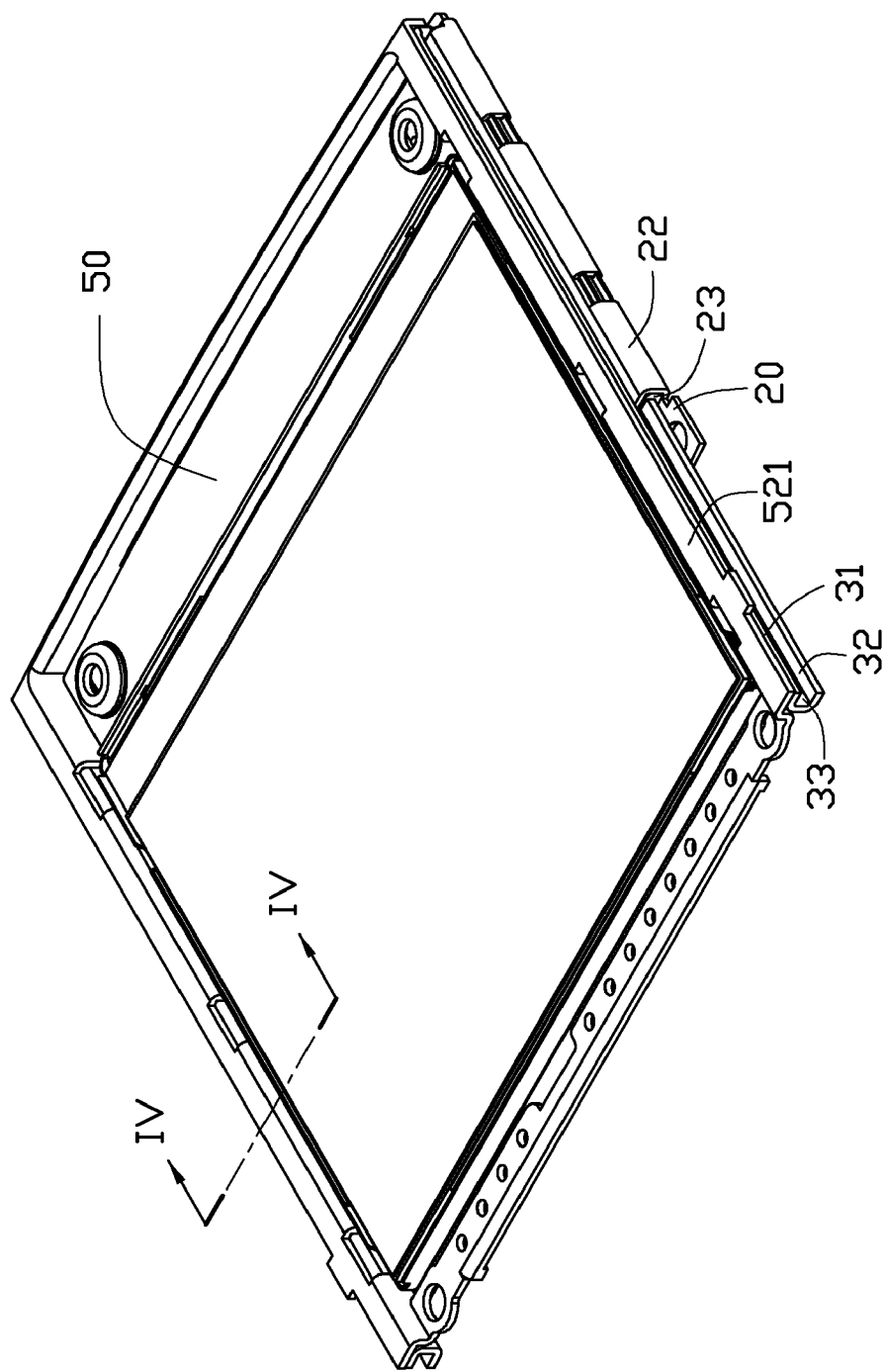
FIG. 3 is an assembled view of the slide mechanism of the FIG. 2.
Figure 4:
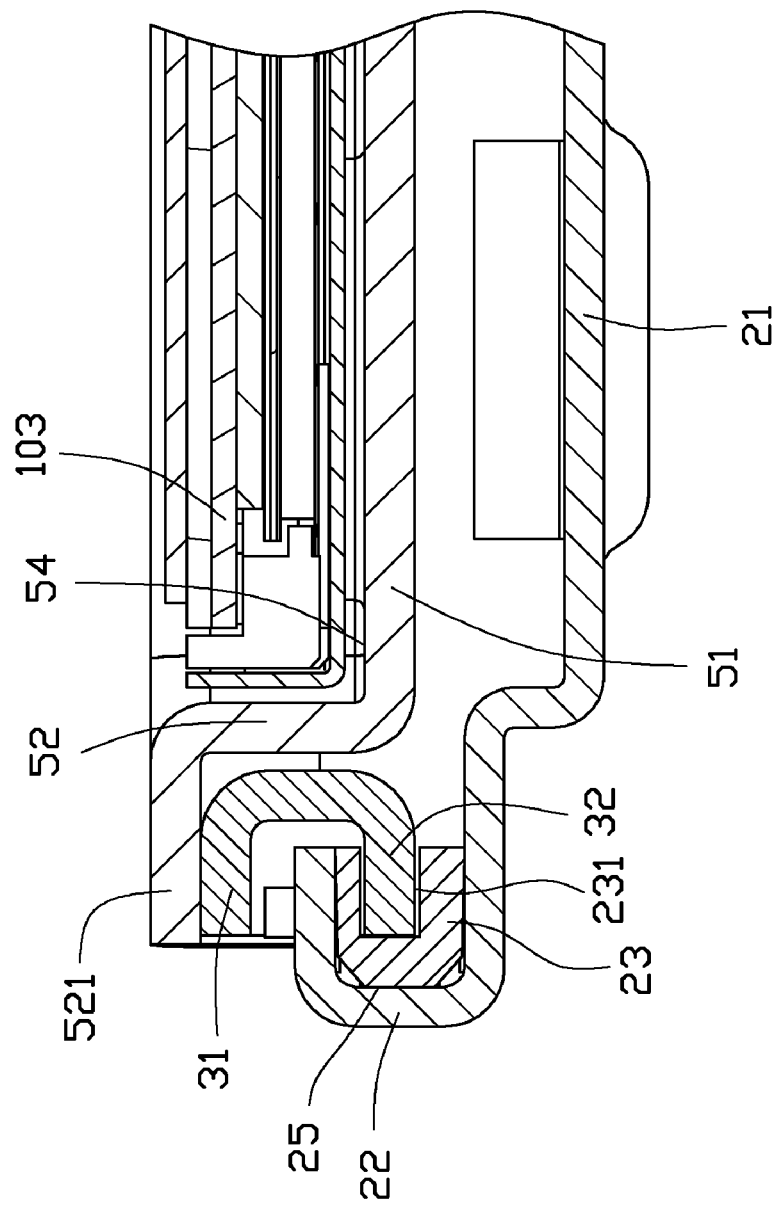
FIG. 4 is a cross-sectional view of FIG. 3 along line IV-IV.

Referring to FIGS. 3 and 4, to assemble the slide mechanism 90, the fixing portions 31 of the connecting members 30 are welded to the extending portions 521 of the slide plate 50. The guiding rails 23 are fixed in the guiding slots 25 of the main plate 20. The connecting portions 41 are respectively secured to the first mounting hole 24 of the main plate 20 and the second mounting hole 55 of the slide plate 50. The slide portions 32 are received in the slide groove 231 and can linearly slide within the slide groove 231. The display panel 103 is received in the recessed portion 54. The slide plate 50 is fixed to the second housing 102 together with the display panel 103. The main plate 20 is fixed to the first housing 101. Thus, the second housing 102 is slideably attached to the first housing 101 by the slide mechanism 90.

The slide mechanism 90 enhances strength of the recessed portion 54 by having the connecting members 30 fixed to the extending portions 521 to protect the display panel 103 received therein from collisions.

Figure 5:
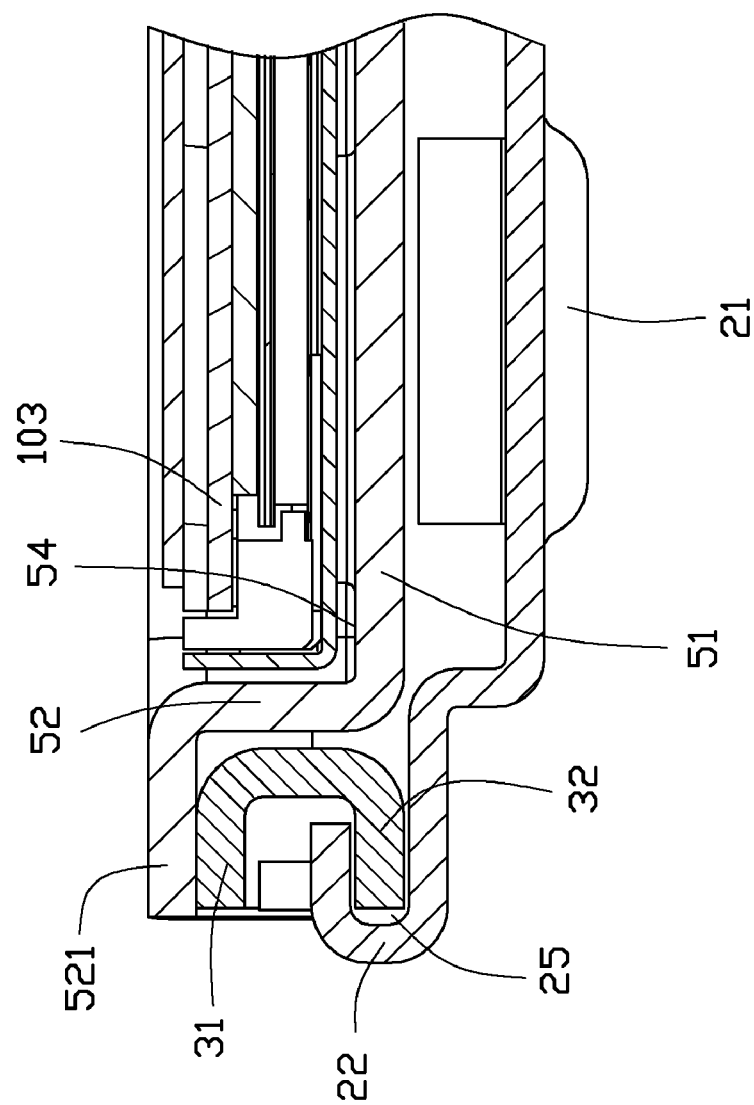
FIG. 5 is a cross-sectional view of a portable electronic device using a slide mechanism, according to another exemplary embodiment.

In addition, the guiding rails 23 are fixed in the guiding slots 25 to reduce gaps between the guiding slots 25 and the sliding portions 32 and prevent wobbling between the slide plate 50 and the main plate 20. Referring to FIG. 5, as previously mentioned, in other embodiments, the guiding rails 23 may be omitted, and the sliding portions 32 directly slideably received in the guiding slots 25.

It is believed that the exemplary embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A slide mechanism, comprising:
   a main plate including two rail portions and two guide rails, each rail portion defining a guide slot, each guide rail received in one of the guide slots and defining a slide groove;
   a slide plate;

an elastic member secured on the main plate and the slide plate; and two connecting members secured to the slide plate and each connecting member slideably received in one of the slide grooves.

2. The slide mechanism as claimed in claim 1, wherein each connecting member includes a fixing portion, a slide portion, and a connecting portion connecting the fixing portion to the slide portion, the fixing portion is secured to the slide plate, the slide portion is slideably received in a corresponding slide groove.

3. The slide mechanism as claimed in claim 1, wherein the main plate includes a main base portion defining a first mounting hole, the slide plate defines a second mounting hole, two ends of the elastic member are respectively secured in the first mounting hole and the second mounting hole.

4. The slide mechanism as claimed in claim 1, wherein the slide plate includes two extending portions extending from two opposite edges thereof, the fixing portions are secured to the extending portions.

5. A portable electronic device, comprising:
a first housing;
a second housing; and
a slide mechanism; comprising:
   a main plate fixed to the first housing and including two rail portions and two guide rails, each rail portion defining a guide slot, each guide rail received in one of the guide slots and defining a slide groove;
   a slide plate fixed to the second housing;
   an elastic member secured on the main plate and the slide plate; and
   two connecting members secured to the slide plate and each connecting member slideably received in one of the slide grooves.

6. The slide mechanism as claimed in claim 5, wherein the connecting member includes a fixing portion, a slide portion, and a connecting portion connecting the fixing portion to the slide portion, the fixing portion is secured to the slide plate, the slide portion is slideably received in a corresponding guiding slot.

7. The slide mechanism as claimed in claim 5, wherein the main plate includes a main base portion defining a first mounting hole, the slide plate defines a second mounting hole, two ends of the elastic member are respectively secured in the first mounting hole and the second mounting hole.

8. The slide mechanism as claimed in claim 5, wherein the slide plate includes two extending portions extending from two opposite edges thereof, the fixing portions are secured to the extending portions.

9. The portable electronic device as claimed in claim 8, further comprising a display panel mounted in the slide plate.

10. The portable electronic device as claimed in claim 9, wherein the slide plate includes a main base portion, two opposite side walls and an end portion, the side walls and the end portion perpendicularly connects edges of the main base portion, and form a recessed portion, the display panel is received in the recessed portion.

11. The portable electronic device as claimed in claim 10, wherein the two extending portion extends from the two side walls.

12. A slide mechanism, comprising:
a main plate including two rail portions, each rail portion defining a guide slot;
a slide plate;
an elastic member secured on the main plate and the slide plate; and
two connecting members secured to the slide plate and each connecting member slideably received in one of guide slots.

* * * * *